United States Patent [19]

Henning

[11] 4,077,277

[45] Mar. 7, 1978

[54] CABLE ASSEMBLY

[75] Inventor: Bodo Henning, Braunschweig, Germany

[73] Assignee: Volkswagenwerk Aktiengesellschaft, Germany

[21] Appl. No.: 709,788

[22] Filed: Jul. 29, 1976

[30] Foreign Application Priority Data

Aug. 29, 1975 Germany ............................ 2538429

[51] Int. Cl.² ................................................ F16C 1/10
[52] U.S. Cl. .................................. 74/501 P; 64/11 R
[58] Field of Search .............. 74/501 R, 501 P; 64/4, 64/11

[56] References Cited

U.S. PATENT DOCUMENTS

| 3,394,704 | 7/1968 | Dery | 74/501 P |
| 3,395,429 | 8/1968 | Payerle | 74/501 P |
| 3,411,374 | 11/1968 | Holly | 74/501 P |
| 3,513,719 | 5/1970 | Tschanz | 64/4 X |

Primary Examiner—Clarence R. Gordon
Attorney, Agent, or Firm—Brumbaugh, Graves, Donohue & Raymond

[57] ABSTRACT

A force transmitting cable assembly is provided with a plastic sheathing overlapping the cable and its endpiece to prevent cable wear and fracturing at the point of cable connection to the endpiece.

1 Claim, 1 Drawing Figure

CABLE ASSEMBLY

BACKGROUND OF THE INVENTION

This invention relates to force transmitting cables of the type used for accelerator or clutch linkage in automobiles. In particular this invention relates to such cables wherein an endpiece is interconnected with the cable in a manner which tends to cause cable fracturing at the endpiece.

Typical cable assemblies for transmitting forces make use of a flexible steel cable which is formed from a plurality of individual strands. In order to interconnect the ends of the cable with associated mechanisms, such cables are generally provided with cable ends in the form of a hook, eye, or other device which may be easily connected with other mechanisms. Such cables are typically used in automobiles to interconnect the accelerator pedal with the carburetor.

The endpieces of such cables are typically attached to the cable by inserting the cable into a bore on the endpiece and soldering the endpiece to the cable or crimping the endpiece thereby deforming the endpiece and effectuating a compression connection with the stranded cable.

Force transmitting cable assemblies are generally attached to associated mechanisms with a pivotable connection so that tensile forces from the cable may be transmitted to the associated mechanism even though the motion of the associated mechanism is in a direction which is different from the direction of cable tension, for example the swivelling motion of a carburetor throttle valve. Because of the differences in direction of motion of the associated mechanism and the direction of cable tension, the cable tends to be subjected to a bending motion which is concentrated at the point in which the cable enters the endpiece. Cable breaking often occurs at this point, even where the bore of the endpiece is provided with a rounded edge to avoid cutting of the cable strands. Weakening and breakage of cable strands also results, particularly where the endpiece is crimped onto the cable, from radial motion of the cable with respect to the endpiece at the point where the cable enters the endpiece.

German utility model No. 1,741,038 shows a cable assembly which includes an inner cable for transmitting tensile forces and a concentric cable jacket which is compressed when tensile forces are applied to the inner cable. The outer jacket is provided with a retaining nut for attaching the cable assembly to an associated mechanism. In accordance with the utility model the nut is provided with a plastic sheathing which overlaps the nut and the jacket. While the plastic sheathing in accordance with the prior design serves the purpose of preventing bending of the jacket in the vicinity of the retaining nut, the plastic sheathing cannot be attached permanently to the outer cable, since the retaining nut must be rotated for attachment to associated mechanisms. Because the sheathing is not permanently affixed, the prior design does not prevent radial movements between the cable and the endpiece.

It is therefore an object of the present invention to provide a new and improved cable assembly which avoids cable fracturing in the vicinity of the endpiece.

It is a further object of the present invention to provide such a cable assembly wherein bending and radial movement of the cable in the vicinity of the endpiece are avoided.

SUMMARY OF THE INVENTION

In accordance with the present invention there is provided a force transmitting cable assembly which includes a flexible cable and an endpiece attached to one end of the cable for interconnection with associated mechanisms. A plastic sheathing is attached to and partially overlaps the cable and the endpiece. The sheathing has a diameter which decreases from the endpiece in the direction of the cable.

In accordance with the invention the plastic sheathing may be either molded or sprayed onto the cable and endpiece.

DESCRIPTION OF THE INVENTION

Figure 1:
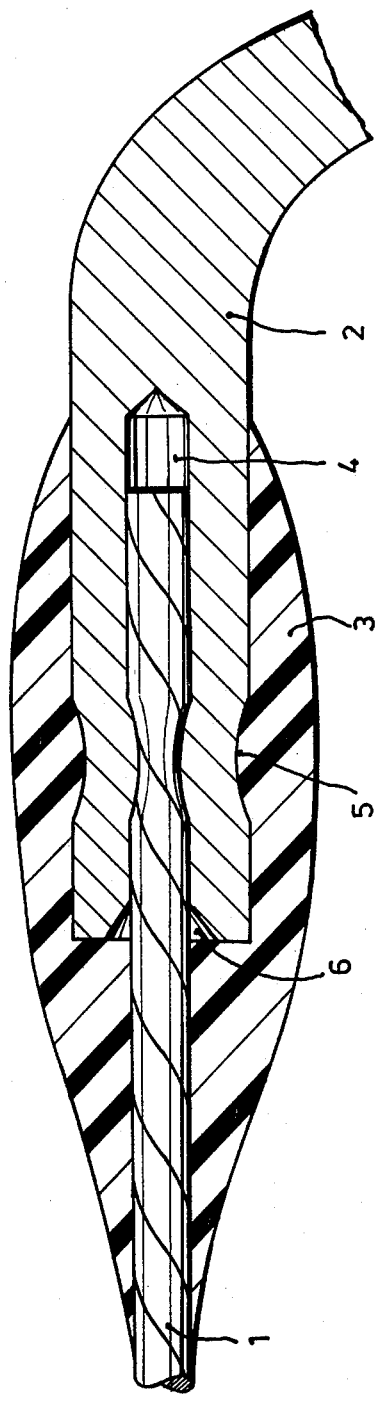
FIG. 1 is a cross-sectional view of a cable assembly in the vicinity of the endpiece illustrating the present invention.

FIG. 1 shows a cross-sectional view of one end of a force transmitting cable 1 which is assemblied to an endpiece 2 in accordance with the present invention. Endpiece 2 is provided with a bore 4 into which cable 1 is inserted. Cable 1 and endpiece 2 are interconnected for force transmission by crimping endpiece 2 as illustrated by 5 so that there is a compression interconnection between cable 1 and endpiece 2. Connection may alternately be provided by soldering cable 1 to endpiece 2. Bore 4 in endpiece 2 is provided with a rounded edge 6 to prevent cutting of the cable at the point where cable 1 enters endpiece 2.

In accordance with the invention there is provided a plastic sheathing 3 which may be applied to the cable and endpiece assembly by molding, spraying, casting or similar techniques. Sheathing 3 is tapered with decreasing diameter from the endpiece in the direction of cable 1.

Sheathing 3 provides a flexible connection between cable 1 and endpiece 2 which prevents excessive bending of the cable 1 at the point cable 1 enters bore 4. In addition sheathing 3 prevents radial motions between cable 1 and endpiece 2 at the point cable 1 enters endpiece 2, thereby preventing abrasion of cable 1 as a result of vibrations or other motions. Sheathing 3 therefore provides an effective and economical remedy for the tendency of force transmitting cables to break in the vicinity of the endpiece. Tests on such cables have indicated a significantly lower incidence of cable breaks in the vicinity of the endpiece, even in the presence of relatively strong bending stresses on the cable in this region.

While there has been described what is believed to be the preferred embodiment of the present invention, those skilled in the art will recognize that other and further modifications may be had thereto without departing from the true spirit of the invention, and it is intended to cover all such embodiments which fall within the true scope of the invention.

I claim:

1. A force transmitting cable assembly comprising a flexible cable, an endpiece attached to one end of the cable for interconnecting the cable with associated mechanisms, and a plastic sheathing adhering to and partially overlapping the cable and the endpiece, said sheathing having a diameter which decreases from the endpiece in the direction of the cable.

* * * * *